(12) United States Patent
O'Neal

(10) Patent No.: US 9,974,292 B2
(45) Date of Patent: May 22, 2018

(54) FISHERMAN'S KNOT TYING TOOL

(71) Applicant: Phyllis D. O'Neal, Lawrenceburg, KY (US)

(72) Inventor: Ronald L. O'Neal, Lawrenceburg, KY (US)

( * ) Notice: Subject to any disclaimer, the term of this patent is extended or adjusted under 35 U.S.C. 154(b) by 0 days. days.

(21) Appl. No.: 14/998,923

(22) Filed: Mar. 4, 2016

(65) Prior Publication Data
US 2016/0270383 A1 Sep. 22, 2016

Related U.S. Application Data

(63) Continuation-in-part of application No. 14/544,921, filed on Mar. 6, 2015, now Pat. No. 9,433,198.

(60) Provisional application No. 62/177,102, filed on Mar. 6, 2015.

(51) Int. Cl.
*A01K 91/04* (2006.01)
*A01K 97/00* (2006.01)

(52) U.S. Cl.
CPC .............. *A01K 91/04* (2013.01); *A01K 97/00* (2013.01)

(58) Field of Classification Search
CPC ................................ A01K 91/04; A01K 97/00
USPC ............................................. 289/1.2, 1.5, 17
See application file for complete search history.

(56) References Cited

U.S. PATENT DOCUMENTS

| | | | |
|---|---|---|---|
| 362,556 A | 5/1887 | Thornburgh | |
| 2,689,147 A | 9/1954 | Smalley | |
| 2,700,840 A * | 2/1955 | Butts | A01K 91/04 223/99 |
| 2,758,858 A * | 8/1956 | Smith, Sr. | A01K 91/04 289/17 |
| 2,843,961 A * | 7/1958 | Semple | A01K 91/04 289/17 |
| 2,926,036 A | 2/1960 | Wimberley | |
| 3,106,417 A * | 10/1963 | Clow | A01K 91/04 289/17 |
| 3,131,957 A | 5/1964 | Musto | |
| 3,177,021 A * | 4/1965 | Benham | A01K 91/04 289/17 |
| 3,265,422 A * | 8/1966 | Pierce | A01K 91/04 289/17 |
| 3,402,957 A | 9/1968 | Peterson | |
| 3,498,656 A * | 3/1970 | Vargo | A01K 91/04 289/17 |
| 4,029,346 A | 6/1977 | Browning | |
| 4,101,152 A * | 7/1978 | Gardipee | A01K 91/04 289/17 |
| 4,403,797 A * | 9/1983 | Ragland, Jr. | A01K 91/04 289/17 |
| 4,573,719 A * | 3/1986 | Aldridge | A01K 91/04 223/99 |
| 4,660,314 A | 4/1987 | Janssen | |
| 4,714,281 A | 12/1987 | Peck | |
| 5,084,058 A * | 1/1992 | Li | A61B 17/0469 289/17 |

(Continued)

*Primary Examiner* — Shaun R Hurley
*Assistant Examiner* — Bao-Thieu L Nguyen
(74) *Attorney, Agent, or Firm* — Carrithers Law Office, PLLC

(57) ABSTRACT

A tool for making the task of tying a hook or bait onto a fishing line easy. The device includes a magnet to hold the hook or bait, holders for each end of the line on either side of the hook, a neck around which to wrap the line and a notch through which the line can be inserted and pulled back under and through the wraps to complete the knot.

20 Claims, 3 Drawing Sheets

(56) References Cited

U.S. PATENT DOCUMENTS

| | | | |
|---|---|---|---|
| 5,192,287 A * | 3/1993 | Fournier | A61B 17/0469 |
| | | | 289/17 |
| 5,236,232 A | 8/1993 | Broberg | |
| 5,557,874 A * | 9/1996 | Pietrandrea | A01K 97/00 |
| | | | 289/17 |
| 5,685,037 A | 11/1997 | Fitzner | |
| 5,716,020 A * | 2/1998 | Shults | A01K 97/28 |
| | | | 242/443 |
| 5,755,371 A * | 5/1998 | Huang | A41H 37/008 |
| | | | 227/67 |
| 5,829,798 A | 11/1998 | Little | |
| 5,951,067 A | 9/1999 | High | |
| 6,077,277 A * | 6/2000 | Mollenauer | A61B 17/04 |
| | | | 606/139 |
| 6,715,804 B2 | 4/2004 | Beers | |
| 6,817,634 B2 * | 11/2004 | Champion | A01K 91/04 |
| | | | 289/1.5 |
| 7,309,086 B2 * | 12/2007 | Carrier | A01K 91/04 |
| | | | 289/17 |
| 7,334,822 B1 | 2/2008 | Hines, Jr. | |
| 7,510,220 B1 | 3/2009 | Wood | |
| 8,146,286 B2 | 4/2012 | Wood | |
| 8,282,659 B2 * | 10/2012 | Oren | A61B 17/0467 |
| | | | 289/17 |
| 8,511,722 B1 * | 8/2013 | Farner | A01K 91/04 |
| | | | 289/17 |
| 8,936,282 B1 * | 1/2015 | Berdahl | B65H 69/04 |
| | | | 289/17 |
| 9,173,647 B2 * | 11/2015 | Bonutti | A61B 17/0218 |
| 9,288,974 B2 * | 3/2016 | Alguire | A01K 95/02 |
| D764,625 S * | 8/2016 | O'Neal | D22/149 |
| 2004/0004355 A1 | 1/2004 | Beers | |
| 2004/0130155 A1 | 7/2004 | Champion | |
| 2007/0182157 A1 | 8/2007 | Carrier | |
| 2008/0087703 A1 * | 4/2008 | Bailly | A61B 17/0401 |
| | | | 227/67 |
| 2010/0156100 A1 | 6/2010 | Goldsmith | |
| 2015/0048616 A1 * | 2/2015 | Mashhour | A01K 91/04 |
| | | | 289/1.5 |

* cited by examiner

FISHERMAN'S KNOT TYING TOOL

CROSS REFERENCES TO RELATED APPLICATIONS

This application is a Continuation-In-Part of U.S. application Ser. No. 14/544,921 filed on Mar. 6, 2015 and claims priority from U.S. Provisional Application Ser. No. 62/177,102 filed on Mar. 6, 2015 both of which are incorporated herein in its entirety.

TECHNICAL FIELD

The present invention relates to the field of devices which aid in the tying of a hook, a leader or an artificial bait onto a fishing line.

BACKGROUND OF THE INVENTION

Tying fine lines to fish hooks is difficult even for an individual with good vision and manual dexterity . . . but for someone who is older, handicapped or not as coordinated as others, the task is frustrating and even dangerous. Whether using monofilament or stranded line, knot tying is difficult even under good conditions. With wet and/or cold hands, the problem is greatly magnified. Because fishing is a popular sport, much interest has been directed towards finding ways of simplifying the attachment of lines to fish hooks.

In all types of fishing, especially fly fishing, to be successful, it is important to be able to relatively easily and quickly change to different flies, hooks or other baits, depending on the water conditions and upon what insect or on which other baits the fish are feeding. During a normal day of fishing, an angler may change flies, hooks, or similar article many times. Because of these numerous changes, it is preferable to be able to tie a secure knot in a timely and efficient manner. Each time the fly, hook or other bait is changed, the line is shortened. To decrease tying time and minimize this loss of line or leader, a convenient and easy to use tool is needed.

DESCRIPTION OF THE RELATED ART

U.S. Pat. No. 6,715,804 by Beers for FISHERMAN'S KNOT TIER which issued on Apr. 6, 2004 teaches a hand tool with an alligator clip which holds the hook while the user ties the knot. With the line threaded in the eyelet, the user twists the line several turns. The tool includes a central shaft which is spring loaded and is held inside a housing by the spring. The user pushes a distal end of the shaft forward so that the distal end of the shaft extends past the housing. The distal end of the shaft contains a notch which holds the end of the fishing line when the line is pulled into the notch. The shaft is then released and the spring pulls the end of the line against the housing to hold the line tightly. Now, while the user holds that portion of the line connected to the real, the tool is pulled to pull the free end of the line through the twists made in the line, until the line is tied tightly around itself.

U.S. Pat. No. 2,926,036 by Wimberley for FISHERMAN'S KNOT TYING TOOL which issued on Feb. 23, 1960 teaches a shaft like tool with a spring fork at the distal end to hold the hook. The user holds the tool with the portion of the line which is connected to the reel against the handle. Now the user wraps the free end of the line around the handle and the portion of line against the handle a selected number of turns. The free end of the line is now held in a notched out portion of the handle which is located distally of the turns of line. Now the turns of line are pulled over and past the notch. The hook is then pulled distally to tighten the turns of line and thus the knot is formed and tightened.

SUMMARY OF THE INVENTION

In accordance with the present invention, there is provided a fisherman's knot tying tool comprising, consisting of, or consisting essentially of a longitudinal handle with a head portion at a first end of the handle. The handle is about five or six inches long and the head portion extends at an angle of around 100 degrees from the first end of the handle portion. The head includes a flat portion at the rear end and has a proximal end, a distal end, a right side, a left side, an upper side and a lower side. The head portion includes a neck having slots formed therein providing a fork into which is inserted a shaft of a hook. The base of the slot contains a strong magnet for forcibly grasping the shaft of the hook. The neck is enlarged at the proximal end and forms a cylindrical base. The neck has a longitudinal notch formed therein at the upper side thereof extending from the cylindrical base to a point near the proximal end of the slots. The notch extends parallel to the axis of the neck and is wide and deep enough to receive and guide a free end of the fishing line. A first elastomeric pad extends from and is fixedly attached to the right side of the junction of the handle and the head portion. The first elastomeric pad includes a slit into which a user can forcibly insert a portion of fishing line, thereby providing a device for forcibly and removably holding the line. A second elastomeric pad extends from and is fixedly attached to the left side of the junction of the handle and the head portion. The second elastomeric pad includes a slit into which a user can forcibly insert a portion of fishing line, thereby providing another device for forcibly and removably holding the line.

It is an object of this invention to provide a fisherman's knot tying tool by which a normal or a handicapped angler may repeatedly tie a knot in the eyelet of a fishing hook, lure or leader, unassisted, whether the handicap is a debilitating disease such as arthritis or when the angler has only one hand.

It is an object of this invention to provide a fisherman's knot tying tool which includes a temporarily attachable clamp for holding the tool during use particularly for a one handed angler.

It is an object of this invention to provide a fisherman's knot tying tool which eases the task of tying a hook or bait onto a fishing line.

It is an object of this invention to provide a fisherman's knot tying tool which is light weight, able to float, decorative, long lasting, easy to operate and equally usable by left or right handed people.

It is an object of this invention to provide a fisherman's knot tying tool which includes elastomeric cleats to hold both ends of the line tight to maintain control of the line while tying the knot.

It is an object of this invention to provide a fisherman's knot tying tool which includes a notch through which the line is fed and is simultaneously inserted through and under wraps or coils of line which have been made in the line in order to complete the knot.

It is an object of this invention to provide a fisherman's knot tying tool which provides a quick and easy temporary attachment of the hook or bait to the tool by the attraction of a powerful magnet in the tool.

It is an object of this invention to provide a fisherman's knot tying tool which provides a non-slip, large, easy to hold handle.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 7 is a right side view of the knot tool of FIG. 1; and.

DESCRIPTION OF THE PREFERRED EMBODIMENTS

Figure 1:
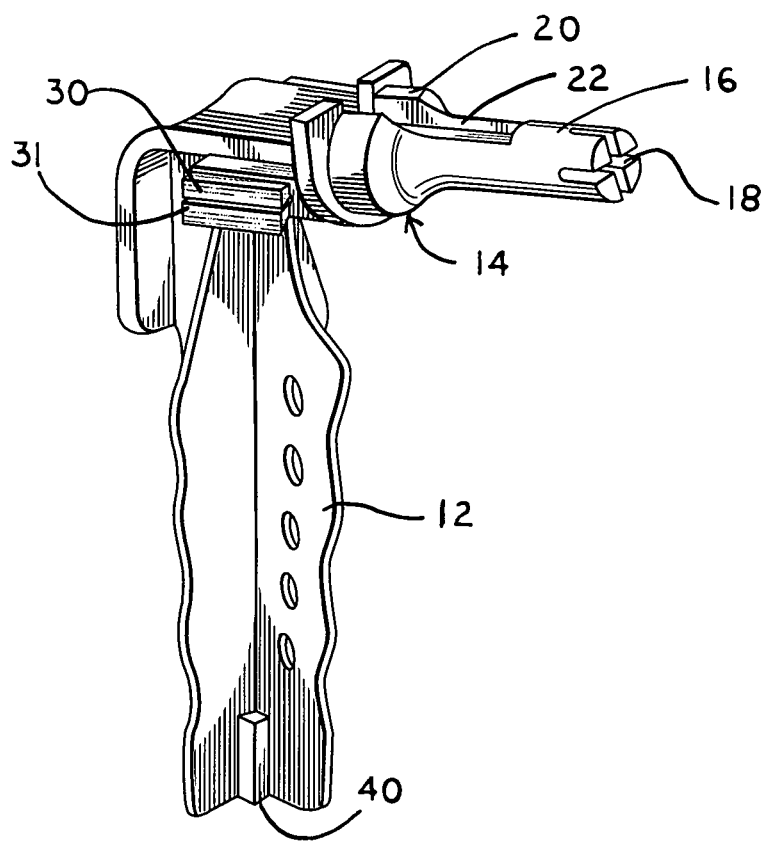
FIG. 1 is a perspective view of the hand held knotting tool.
Figure 2:
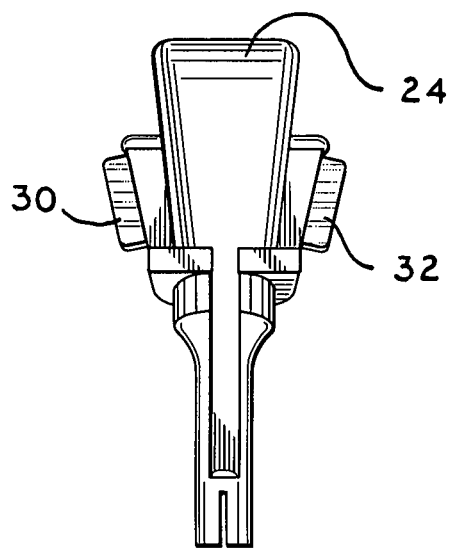
FIG. 2 is a top view of the knot tool of FIG. 1.
Figure 3:
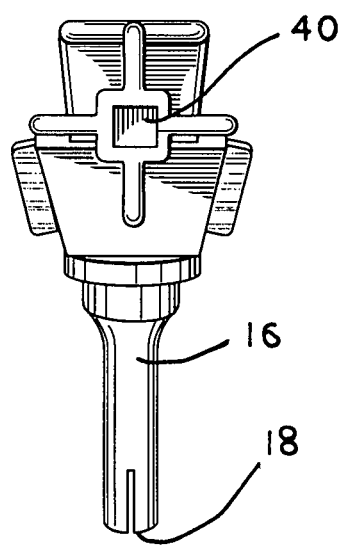
FIG. 3 is a bottom view of the knot tool of FIG. 1.
Figure 4:
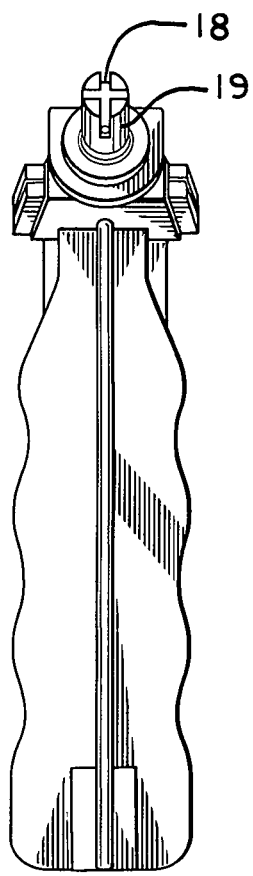
FIG. 4 is a front view of the knot tool of FIG. 1.
Figure 5:
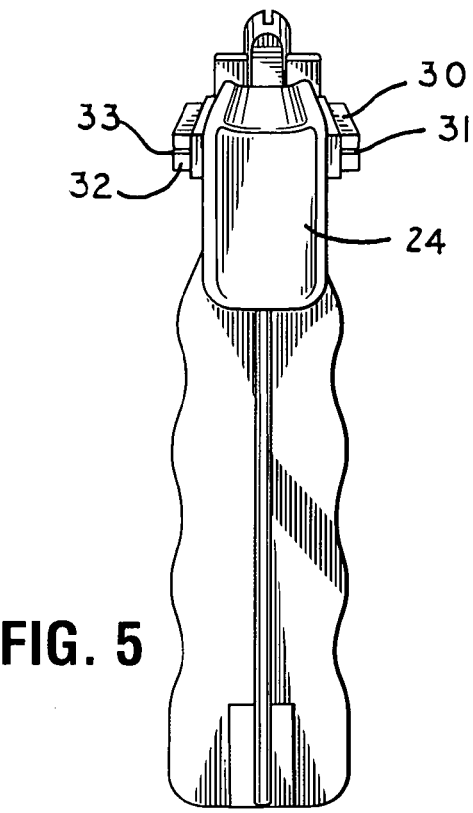
FIG. 5 is a rear view of the knot tool of FIG. 1.
Figure 6:
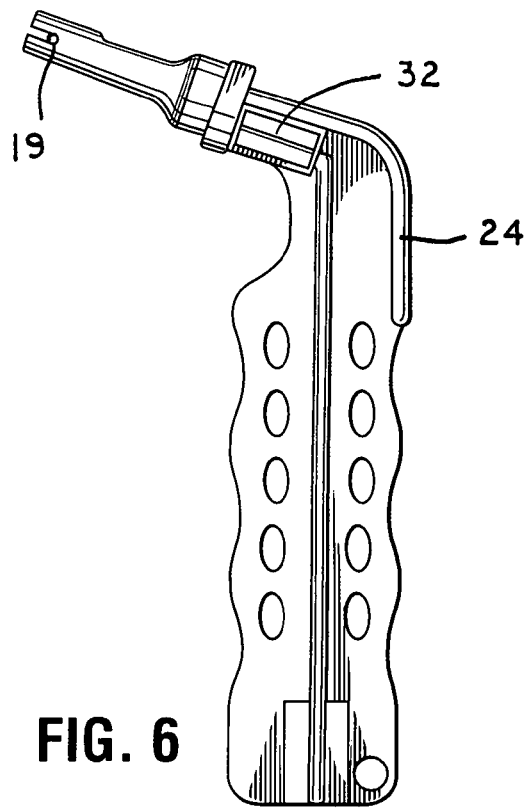
FIG. 6 is a left side view of the knot tool of FIG. 1.
Figure 7:
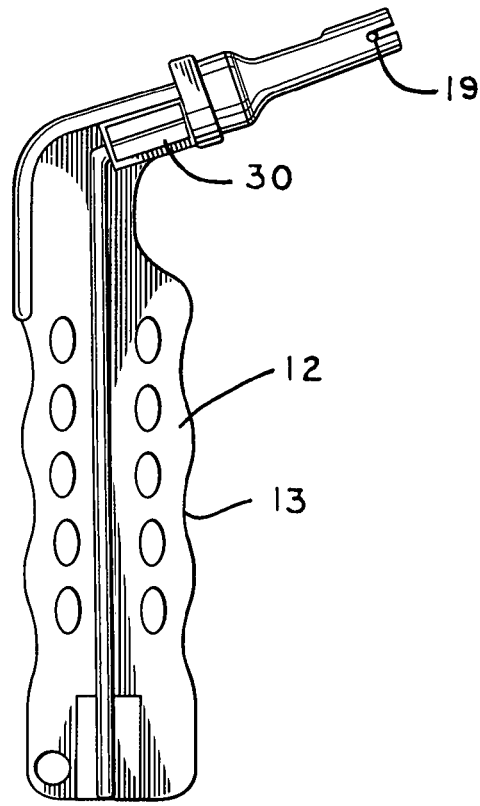
Figure 8:
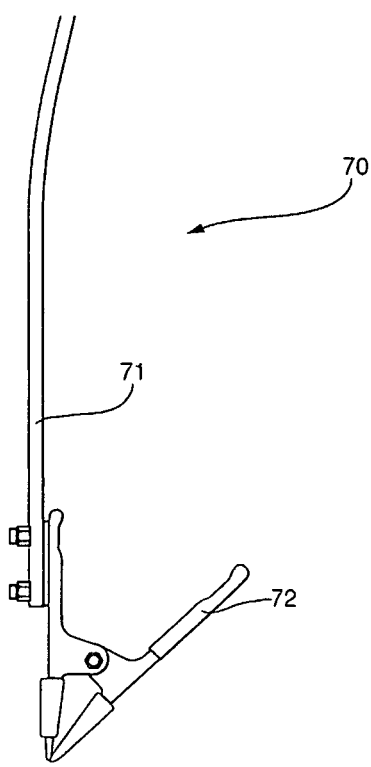
FIG. 8 is a side view of the removable holding clamp assembly for affixing the knotting tool to a selected rigid structure.

In accordance with the present invention, there is provided a fisherman's knot tying tool 10, as shown in the figures. The tool is also referred to as the knot tool 10. As shown in FIG. 1, the knot tool 10 includes a longitudinal handle 12 and a head portion 14 at the end of the handle 12. The handle 12 is preferably about five or six inches long with four indentations 13 which cooperatively engage the user's fingers to improve the grip. As shown in FIGS. 6 and 7, the head preferably extends at an angle of around 100 degrees from the distal end of the handle portion 12. The head 14 includes a flat portion 24 at the rear against which the user's thumb presses.

A hook or bait holding portion includes a neck 16 which has slots 18 at the distal end which provide a fork into which is inserted the shaft of the hook. Fixedly attached at the base of the slot 18 is a strong magnet 19 at the center of the fork which forcibly holds the shaft of the hook within the slot 18. The neck 16 enlarges at the proximal end to form a cylindrical base 20 around which is wrapped or coiled a selected number of coils of line during the tying of the knot. The neck 16 includes a notch or valley 22 extending from the cylindrical base 20 to a point near the proximal end of the slots 18.

An elastomeric pad 30 extends from and is fixedly attached to the right side of the junction of the handle 12 and the head 14. The elastomeric pad 30 includes a slit 31 into which a user can forcibly insert a portion of fishing line, thereby providing a grasping device for the line. Another elastomeric pad 32 extends from and is fixedly attached to the left side of the junction of the handle 12 and the head 14. The elastomeric pad 32 also includes a slit 33 into which can be forcibly inserted a portion of fishing line, thereby providing a grasping device for the line. These pads 30 and 32 are used to hold the portions of the fishing line while the user forms the knot.

At the free distal end of the handle 12 includes a coaxial elongated cube shaped cavity 40 which cooperatively and removably receives a free distal end of a square shaped rod 71 of a knotting tool holding clamp assembly 70. The proximate end of the rod 71 is fixedly attached to a clamp 72. The clamp 72 is then removably attached to an edge of a convenient surface such as a table, chair, tackle box, or the gunnel of a boat. With the knotting tool 10 firmly held in place by the rod and clamp, a one handed user can use the tool to tie a knot in the fishing line.

The procedure for using the knot tying tool for two handed use by a right-handed angler is as follows:

Thread the line through the eyelet of the hook with 12-18 inches pulled past the eyelet.

Place the tool in the left hand with the forked end 18 facing toward the right hand.

Place the shaft of the hook in the slot 18 against the magnet 19 with the hook portion facing distally from the left hand.

With a rearward tug, place portion of the line connected to the fishing rod forcibly in the slit 33 of the left elastomeric pad 32. With a rearward tug, place free portion of the line forcibly in the slit 31 of the right elastomeric pad 30, leaving as much of the free end of the line dangling loosely from the slit 31.

Wrap the free end of the line overhand around the cylindrical base 20 forming a selected number of coils around the cylindrical base 20. There will preferably be at least five coils. At this point, it is helpful to forcibly push the line into the slit 31 to keep the line under control, leaving the free end of the line hanging loose from the slit 31.

Feed the free end of the fishing line into the distal end of the notch 22 and on under and through the coils of line.

Then grasp the free end of the line and pull to tighten the knot. While pulling the free end of the line, push the two portions of line free of the slits 31 and 33.

Pull the free end of the line until the knot is completed.

Cut the dangling free end of the line near to the knot as desired.

For a one handed angler, instead of holding the tool with his left hand, the user attaches to tool to the end of the clamp 44 and then attaches the clamp to a convenient edge.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A fisherman's knot tying tool comprising:

a longitudinal handle having a head portion at an upper end of said longitudinal handle, said longitudinal handle having a selected length, said head portion extending at a selected angle from said upper end of said longitudinal handle portion and said head portion including a flat portion at a rear end, said head portion having a proximal end, a distal end, a right side, a left side, an upper side and a lower side;

said head portion including a neck having slots formed therein, said slots forming a fork into which is inserted a shaft of a hook, a base of said slots containing a magnet for forcibly grasping said shaft of said hook, said neck being enlarged at a proximal end to form a cylindrical base, said neck having a longitudinal notch formed therein at an upper side thereof extending from said cylindrical base to a point near a proximal end of said slots, said notch extending parallel to an axis of said neck wide and deep enough to receive and guide a free end of a fishing line; and a first elastomeric pad extending from and fixedly attached to a right side of a junction of said longitudinal handle and said head portion, said first elastomeric pad including a first slit for receiving a first portion of said fishing line, thereby providing a device for forcibly and removably holding said fishing line, a second elastomeric pad extending from and fixedly attached to a left side of a junction of said longitudinal handle and said head portion, said second elastomeric pad including a second slit for receiving a second portion of said fishing line, thereby providing a device for forcibly and removably holding said fishing line.

2. The fisherman's knot tying tool of claim 1 wherein a free end of said longitudinal handle includes an open ended coaxial elongated cube shaped cavity into which is inserted a first end of a square shaped rod, a second end of said rod fixedly attached to a clamp.

3. The fisherman's knot tying tool of claim 1 wherein said with handle includes a plurality of indentations.

4. The fisherman's knot tying tool of claim 1 wherein said distal end of said handle includes a cavity for cooperatively and removably engaging a free distal end of a support rod extending from a holding clamp.

5. The fisherman's knot tying tool of claim 1 wherein said selected angle said head portion extends from said handle portion comprises an angle of about 100 degrees.

6. A fisherman's knot tying tool comprising:

a longitudinal handle having a head portion at an upper end of said longitudinal handle, said longitudinal handle having a selected length, said head portion extending at a selected angle from said upper end of said handle portion and including a rear end, a proximal end, a distal end, a right side, a left side, an upper side and a lower side;

said head portion including a neck including at least one distal end slot formed therein, said distal end slot forming a fork into which is inserted a shaft of a hook, a magnet is disposed at a base of said distal end slot for forcibly grasping said shaft of said hook, said neck being enlarged at a proximal end to form a cylindrical base for coiling a fishing line there around, said neck having a longitudinal notch formed therein at an upper side thereof extending from said cylindrical base to a point near a proximal end of said slots, said notch extending parallel to an axis of said neck wide and deep enough to receive and guide a free end of said fishing line; and at least one means for holding extending from and fixedly attached to a selected side of a junction of said handle and said head portion, said at least one means for holding including a slit for receiving a first portion of said fishing line for removably holding said fishing line.

7. The fisherman's knot tying tool of claim 6 wherein said holding means comprises an elastomeric pad.

8. The fisherman's knot tying tool of claim 6 wherein said holding means comprises a cleat.

9. The fisherman's knot tying tool of claim 6 wherein a free end of said handle includes an open ended coaxial elongated cube shaped cavity into which is inserted a first end of a square shaped rod, a second end of said rod fixedly attached to a clamp.

10. The fisherman's knot tying tool of claim 6 including a second free holding means extending from and fixedly attached to a left side of a junction of said handle and said head portion, said second holding means including a second slit for receiving a second portion of said fishing line.

11. The fisherman's knot tying tool of claim 6 wherein said selected angle said head portion extends from said handle portion comprises an angle of about 100 degrees.

12. The fisherman's knot tying tool of claim 6 wherein said head portion including a neck including a plurality of said distal end slots.

13. The fisherman's knot tying tool of claim 6 said head portion further including a flat portion at said rear end.

14. A fisherman's knot tying tool comprising:

a longitudinal handle having a head portion at an upper end of said longitudinal handle, said longitudinal handle having a selected length, said head portion extending at a selected angle from said upper end of said handle portion and including a rear end, a proximal end, a distal end, a right side, a left side, an upper side and a lower side;

said head portion including a neck including at least one distal end slot formed therein, said distal end slot forming a fork into which is inserted a shaft of a hook, a magnet is disposed at a base of said distal end slot for forcibly grasping said shaft of said hook, said neck being enlarged at a proximal end to form a cylindrical base for coiling a fishing line there around, said neck having a longitudinal notch formed therein at an upper side thereof extending from said cylindrical base to a point near a proximal end of said slots, said notch extending parallel to an axis of said neck wide and deep enough to receive and guide a free end of said fishing line; and a first means for holding extending from and fixedly attached to a selected side of a junction of said handle and said head portion, said first means for holding including a slit for receiving a first portion of said fishing line and a second means for holding extending from and fixedly attached to a selected side of a junction of said handle and said head portion, said second means for holding including a slit for receiving a second portion of said fishing line removably holding said fishing line.

15. The fisherman's knot tying tool of claim 14 wherein said holding means comprises an elastomeric pad.

16. The fisherman's knot tying tool of claim 14 wherein said holding means comprises a cleat.

17. The fisherman's knot tying tool of claim 14 wherein a free end of said handle includes an open ended coaxial elongated cube shaped cavity into which is inserted a first end of a square shaped rod, a second end of said rod fixedly attached to a clamp.

18. The fisherman's knot tying tool of claim 14 wherein said selected angle said head portion extends from said handle portion comprises an angle of about 100 degrees.

19. The fisherman's knot tying tool of claim 14 wherein said head portion including a neck including a plurality of said distal end slots.

20. The fisherman's knot tying tool of claim 14 said head portion further including a flat portion at said rear end.

* * * * *